Patented Feb. 18, 1941

2,232,539

UNITED STATES PATENT OFFICE 2,232,539

METHOD OF SUBSTANCE DETECTION

Irving Langmuir, Schenectady, N. Y., assignor to General Electric Company, a corporation of New York No Drawing. Original application July 27, 1937, Serial No. 155,959. Divided and this application March 30, 1939, Serial No. 264,988

3 Claims. (Cl. 88—14)

This application is a division of my prior application, Serial No. 155,959, filed July 27, 1937, and assigned to the General Electric Company.

The aforesaid application discloses and claims a novel method for applying "monolayers" to an extended solid surface. (A monolayer may be defined as a single layer or stratum of atoms or molecules, such layer being characterized by a uniform thickness of molecular magnitude.)

It is an object of the present invention to provide a method dependent on the properties of monolayers for detecting substances present in small proportions in a carrier medium. Before discussing this aspect of the invention, however, it will be helpful to refer generally to the technique of monolayer formation.

In an article published in the Journal of the American Chemical Society, vol. 57, page 1007, Dr. K. B. Blodgett has shown that monolayers preliminarily formed on the surface of a liquid carrier medium may be transferred to the surface of a solid base member, this procedure being applicable only to monolayers which are insoluble in the carrier medium. According to my aforesaid prior application, however, extended solid surfaces may be so conditioned or prepared as to adsorb monolayers from solution, thus greatly extending the field of useful application of the monolayer principle.

In this latter connection, a surface which is not inherently adapted to receive a given substance, may be preliminarily covered with an adhering film including a surface monolayer of a material which is capable of reacting with the selected substance. Under these conditions, upon exposing the prepared surface to a carrier medium containing the selected substance, adsorption of a monolayer thereof may occur.

As an example of such conditioning, we may refer to a film having a surface monolayer of barium stearate to which it is desired for one reason or another to apply a monolayer of a silicate. Silicates generally are not capable of being applied as monolayers by deposition from liquid surfaces and permit of no reaction with barium stearate which would make possible the procedure of direct adsorption from solution. I have found, however, that by immersing the barium stearate surface in a solution containing, for example, thorium nitrate, its adsorptive properties may be substantially modified, such modification being presumably due to the adsorption of a monolayer of thorium atoms, which adheres strongly to the barium stearate. If the conditioned surface is then brought into intimate contact with an aqueous solution of, say, sodium silicate, adsorption of a further monolayer containing silica will take place. This last mentioned action is presumably due to chemical reaction between the thorium and the silicate and results in the creation of a monolayer of thorium silicate covering the barium stearate.

It is not necessary to use thorium nitrate as a conditioning agent and various other salts of thorium or of other metals may be employed. Another material which I have used successfully in this connection is aluminum chloride. The particular agent to be utilized depends, of course, on the nature of the base surface and of the substance desired to be applied as a monolayer thereto.

The discovery which is set forth in the foregoing makes available an extremely sensitive method for detecting substances suspected but not known to be present in small proportions in a carrier medium and for measuring the molecular dimensions of such substances. According to this method, one may prepare a monolayer which is conditioned selectively to adsorb the suspected substance and no other likely to be present. The prepared surface may then be exposed to the carrier medium, the occurrence or non-occurrence of a change in the properties of the surface being indicative of the presence or absence of the suspected substance.

Various properties of monolayers may be employed as indicia of the adsorption of a foreign substance desired to be detected. For example, one may observe variations in thickness, refractive index, solubility, volatility, contact angle against various liquids, adsorbing power for other substances, etc.

A highly sensitive method of procedure, capable of wide application, is as follows: One may apply to a polished surface for example, of metal or glass, over a surface large enough to be conveniently observed, a stratified film comprising monolayers of barium stearate or an equivalent material formed by successive deposition in the manner described in K. B. Blodgett application Serial No. 147,697 filed June 11, 1937, and assigned to the same assignee as the present invention. As therein explained, the film should be of a total thickness sufficiently great to cause observable interference effects when viewed by visible light and preferably such that the addition of a further monolayer of dimensions corresponding to the known molecular dimensions of the suspected substance will produce a definitely predictable variation in the interference effects. For each film material a range of critical thickness may be found within which a thickness increase of even 2 Angstrom units will cause an observable variation in interference effects. In the case of barium stearate a film having about 47 layers may advantageously be employed.

The barium stearate or equivalent surface may be conditioned to receive a monolayer of a material which is itself adapted selectively to adsorb the suspected substance. The conditioning may be accomplished as previously indicated by applying an adhering film or monolayer which is capable of reacting with the adsorbent material desired to be added. For many cases thorium nitrate is found to be an appropriate conditioning agent.

Selective adsorbency may be obtained by employing as a surface monolayer a material which is specifically reactive with respect to the suspected substance. By exposing such a selectively adsorbent surface to a carrier medium believed to contain the suspected substance and noting the occurrence or non-occurrence of a variation in the interference effects of the prepared film, the presence or absence of the substance may be definitely determined. If the substance is actually present, a monolayer thereof will be adsorbed on the film surface, thereby producing an increase in film thickness and a consequent observable change in its interference properties. The nature or degree of the change produced will also provide a measure of one of the molecular dimensions of the adsorbed substance.

Specific reactions are numerous in biological and toxicological fields, so that the method just outlined is capable of application in such fields. Particular specifically reactive combinations which may be mentioned in this connection comprise digitonin and cholesterol, and hydrocarbons and bile acids. The application of a member of one of these pairs to a conditioned base member makes it possible to test a carrier medium for the other member of the pair. Many proteins, including disease toxins and viruses are also capable of specific reactions, so that the invention may be used in the study and control of biological reactions involved in the diagnosis and treatment of disease.

What I claim as new and desire to secure by Letters Patent of the United States, is:

1. The method of determining the presence or absence of a substance suspected but not known to be present in small proportions in a carrier medium which comprises forming on a relatively smooth, reflective base member a film of successively applied monolayers including a surface monolayer of a material which is adapted selectively to adsorb the said substance from the carrier medium without adsorbing other substances likely to be present in the medium, a sufficient number of monolayers being applied so that their total thickness is such as to produce critical interference effects when viewed by visible light, exposing the film to the carrier medium to permit adsorption of a monolayer of the substance if present, and thereafter examining the film to determine the occurrence or non-occurrence of a change in said critical interference effects determinative of the presence of the said substance in the medium.

2. The method of determining the presence or absence of a substance suspected but not known to be present in small proportions in a carrier medium, which method comprises forming a film including a surface monolayer of a material which is adapted selectively to adsorb the said substance from the medium without adsorbing any other substance likely to be present in the medium, such selective adsorption being accompanied upon its occurrence by an observable alteration in the properties of the film, exposing the prepared film to the carrier medium to permit adsorption of the suspected substance if present, and thereafter examining the film to determine the occurrence or non-occurrence of the said observable alteration of the film properties.

3. The method of detecting and measuring the molecular dimensions of a substance suspected but not known to be present in a carrier medium, which method comprises forming on a relatively smooth and reflective base member a film of successively applied monolayers including a surface monolayer of a material which is adapted to adsorb the said substance from the carrier medium without adsorbing any other substance likely to be present in the medium, a sufficient number of monolayers being applied so that their total thickness is such as to produce critical interference effects when viewed by visible light, thereafter exposing the film to the carrier medium to cause adsorption of the said substance if present, and finally examining the film to determine the occurrence or non-occurrence of a change in the said interference effects and further to determine the nature of any change which occurs, thereby to obtain an indication of the molecular dimensions of the adsorbed substance to which such change is attributable.

IRVING LANGMUIR.